June 5, 1923.
R. A. WHITTINGHAM
1,457,683
TRUCK WHEEL
Original Filed Dec. 6, 1920
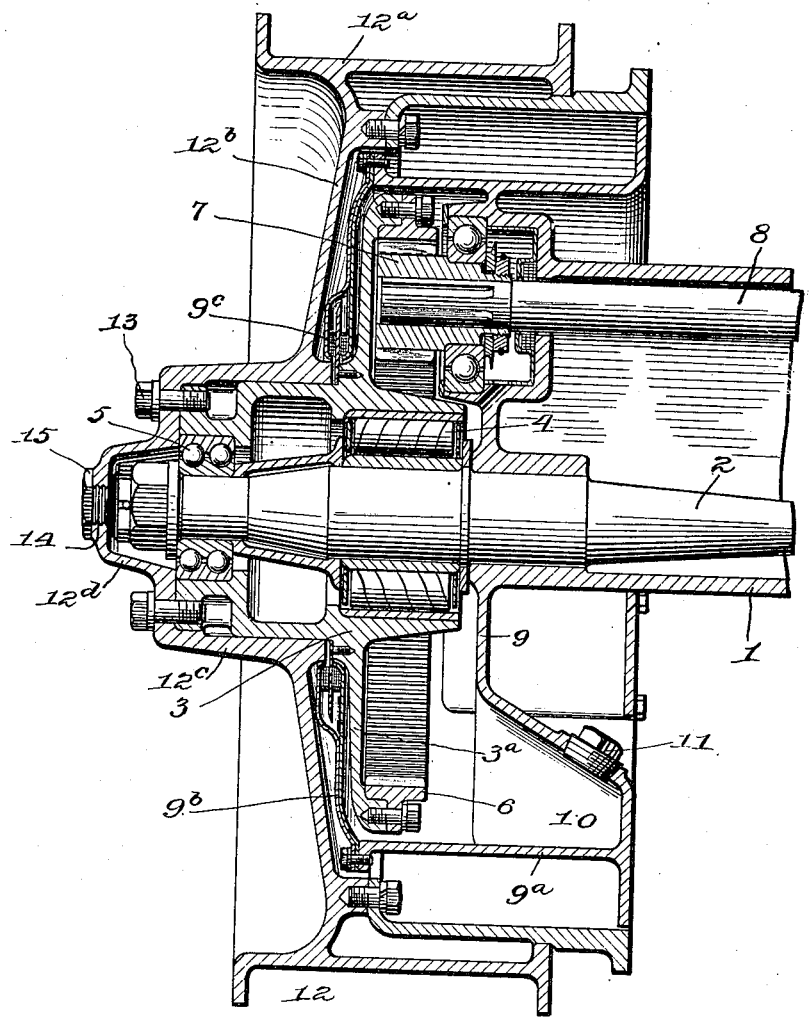
Inventor
Richard A. Whittingham
By
Robert H. Watson
Attorney Patented June 5, 1923.

1,457,683

UNITED STATES PATENT OFFICE.

RICHARD A. WHITTINGHAM, OF NEWARK, DELAWARE, ASSIGNOR TO ATLAS AXLE COMPANY, OF WILMINGTON, DELAWARE, A CORPORATION OF DELAWARE.

TRUCK WHEEL.

Application filed December 6, 1920, Serial No. 428,557. Renewed January 27, 1923.

*To all whom it may concern:*

Be it known that I, RICHARD A. WHITTINGHAM, a citizen of the United States, residing at Newark, in the county of New Castle and State of Delaware, have invented certain new and useful Improvements in Truck Wheels, of which the following is a specification.

This invention relates to traction wheels for motor driven vehicles, more particularly trucks. The wheel, as illustrated in the accompanying drawings, is used in connection with a driving gear, mounted upon a spindle projecting from an axle casing, the gear being enclosed in an oil retaining housing and having a hub which extends outwardly through the housing. The gear hub is spaced from the spindle by anti-friction bearings and the inner end of the hub is open and communicates with the interior of the oil-retaining housing. The wheel is cast in one piece, including a wheel hub which fits closely on to the gear hub and has a cap integral with the wheel hub which extends over the outer ends of the wheel spindle and gear hub. This cap forms part of the oil retaining housing, and by making the cap integral with the wheel hub no leakage of oil can occur between these parts. As the traction wheels are heavy and sometimes difficult to remove from the gear hubs, I provide a threaded opening in the cap, in line with the axis of the spindle, in order that a threaded rod may be screwed into said opening and against said spindle to force the wheel off of the gear hub. This opening, however, except when the wheel is to be removed, is closed by a suitable plug threaded into said opening.

The accompanying drawing, which illustrates the invention, is a central, vertical section through a traction wheel, driving gears therefor, and one end of an axle casing.

Referring to the drawing, 1 indicates the rear axle casing of a motor truck, having a wheel spindle 2, projecting from its end. Upon this spindle is mounted a gear hub 3, having roller bearings 4, at its inner end, and ball bearings 5 at its outer end. This hub has an integral flange $3^a$, which carries an internal gear 6, and the latter meshes with a pinion 7, upon a drive shaft 8, which extends through the axle casing and is driven from the differential gearing in the usual way. The internal gear is enclosed in an oil-retaining housing which includes a rear plate 9, on the end of the axle casing, a flange $9^a$, secured to said plate, and a front plate $9^b$, which is detachably secured to said flange and extends inwardly to the hub 3, at the front of the gear. Between said front plate and said hub is arranged a suitable oil seal $9^c$. An oil chamber 10, enclosing the gear and the pinion, is formed by the parts just described, and a suitable depth of oil is kept in this chamber. Oil may be introduced into the chamber through an opening in the plate 9, which is normally closed by a plug 11. The gear hub is spaced from the wheel spindle by the bearings 4 and 5, and the inner end of the hub is open and in communication with the interior of the oil chamber 10, so that oil, which is carried around and distributed by the gears, may freely enter the interior of the gear hub and lubricate its bearings. The gear hub projects outwardly through the oil retaining housing, past the oil seal, as shown, and the wheel 12 is secured to this extension of the gear hub. As shown, the wheel is cast in one piece, including the rim $12^a$, web $12^b$, hub $12^c$, and hub cap $12^d$. The hub $12^c$ fits closely on to the extended portion of the gear hub, and the wheel is held in place by bolts 13, which extend through the cap and into the end of the gear hub. The cap extends over the open outer end of the gear hub and over the end of the wheel spindle and forms an oil-tight closure for the end of the gear hub. The central part of the cap is provided with a threaded opening 14, which is normally closed by a threaded plug 15. This opening is in line with the axis of the wheel spindle 2, and the purpose of providing this opening is to facilitate the removal of the wheel, when desired, by inserting a threaded rod in the opening 14, and turning this rod so that it will bear against the spindle 2 and force the wheel from the gear hub, the bolts 13, of course, being first removed.

With the rough usage which motor trucks receive, it is difficult to maintain an oil-tight seal around the driving gears and wheel bearings, and one source of leakage is at the hub cap. Where the bearings for the gear and truck wheel are in open communication with an oil chamber, as shown in the accompanying drawing, it is desirable to keep the outer end of the bearing entirely sealed, and this is accomplished in the present invention by making the cap integral with the wheel hub, whereby these parts are always removed and replaced as a unit and never taken apart.

What I claim is:

1. The combination with an axle casing, a wheel spindle projecting therefrom, a gear journaled upon the spindle and having an outwardly extended hub, and a housing enclosing said gear, said gear hub projecting through the housing and the interior of said housing being in communication with the bearings of said hub, of a vehicle wheel having a hub fitting on to the gear hub and having a cap, integral with the wheel hub, extending over the end of the gear hub and spindle.

2. The combination with an axle casing, a wheel spindle projecting therefrom, a gear journaled upon the spindle and having an outwardly extended hub, and a housing enclosing said gear, said gear hub projecting through the housing and the interior of said housing being in communication with the bearings of said hub, of a vehicle wheel having a hub fitting on to the gear hub and having a cap, integral with the wheel hub, extending over the end of the gear hub and spindle, said cap having a threaded opening in line with the spindle, and a plug for closing said opening.

In testimony whereof I affix my signature.

RICHARD A. WHITTINGHAM.